United States Patent
Salinger et al.

(10) Patent No.: US 11,962,404 B2
(45) Date of Patent: *Apr. 16, 2024

(54) MANAGING UPSTREAM TRANSMISSION IN A NETWORK

(71) Applicant: Comcast Cable Communications, LLC, Philadelphia, PA (US)

(72) Inventors: Jorge Salinger, Littleton, CO (US); David Urban, Downingtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,388

(22) Filed: Jan. 10, 2023

(65) Prior Publication Data
US 2023/0171019 A1 Jun. 1, 2023

Related U.S. Application Data

(63) Continuation of application No. 17/337,844, filed on Jun. 3, 2021, now Pat. No. 11,575,461, which is a
(Continued)

(51) Int. Cl.
*H04L 1/20* (2006.01)
*H04J 3/14* (2006.01)
(Continued)

(52) U.S. Cl.
CPC ............. *H04L 1/0002* (2013.01); *H04J 3/14* (2013.01); *H04J 3/1694* (2013.01);
(Continued)

(58) Field of Classification Search
CPC ..... H04L 1/0002; H04L 1/1887; H04L 1/206; H04L 12/2801; H04L 12/2861;
(Continued)

(56) References Cited

U.S. PATENT DOCUMENTS 3,952,189 A 4/1976 Fabricius
5,870,429 A 2/1999 Moran, III et al.
(Continued)

FOREIGN PATENT DOCUMENTS

EP 2028776 A1 2/2009

OTHER PUBLICATIONS

Partial European Search Report—EP11165006.5—dated Nov. 22, 2012.
(Continued)

*Primary Examiner* — Phong La
(74) *Attorney, Agent, or Firm* — Banner & Witcoff, Ltd.

(57) ABSTRACT

A bandwidth allocation and monitoring method may divide available bandwidth on a shared communication medium into a plurality of discrete tones that can be individually allocated to modems on an as-needed basis. The effective modulation rate that a particular modem can use for each discrete tone can be monitored over time using a schedule of pilot tones transmitted from the modems on different tones at different times. The schedule may define representative pilot tones, in which case effective modulation rates for neighboring tones may be inferred from a determined effective modulation rate of a pilot tone.

60 Claims, 11 Drawing Sheets

Related U.S. Application Data continuation of application No. 16/701,906, filed on Dec. 3, 2019, now Pat. No. 11,057,147, which is a continuation of application No. 14/482,765, filed on Sep. 10, 2014, now Pat. No. 10,530,520, which is a continuation of application No. 12/776,584, filed on May 10, 2010, now Pat. No. 8,867,561.

(51) Int. Cl.
| | | |
|---|---|---|
| *H04J 3/16* | (2006.01) | |
| *H04L 1/00* | (2006.01) | |
| *H04L 1/18* | (2023.01) | |
| *H04L 1/1867* | (2023.01) | |
| *H04L 12/28* | (2006.01) | |
| *H04L 27/26* | (2006.01) | |
| *H04L 5/00* | (2006.01) | |

(52) U.S. Cl.
CPC ............ *H04L 1/1887* (2013.01); *H04L 1/206* (2013.01); *H04L 12/2801* (2013.01); *H04L 12/2861* (2013.01); *H04L 27/2613* (2013.01); *H04L 5/0048* (2013.01); *H04L 5/006* (2013.01)

(58) Field of Classification Search
CPC .......... H04L 5/0048; H04L 5/006; H04J 3/14; H04J 3/1694
See application file for complete search history.

(56) References Cited

U.S. PATENT DOCUMENTS

| | | | |
|---|---|---|---|
| 6,877,166 B1 | 4/2005 | Roeck et al. | |
| 7,023,871 B2 | 4/2006 | Lind et al. | |
| RE40,322 E | 5/2008 | Williams | |
| 7,523,329 B2 | 4/2009 | Ezra et al. | |
| 8,201,207 B2 | 6/2012 | An et al. | |
| 2001/0001616 A1* | 5/2001 | Rakib | H04L 1/006 375/259 |
| 2001/0055352 A1 | 12/2001 | Bannasch et al. | |
| 2002/0144290 A1 | 10/2002 | Ovadia | |
| 2003/0048922 A1 | 3/2003 | Rhoads | |
| 2003/0179770 A1 | 9/2003 | Reznic et al. | |
| 2003/0197558 A1 | 10/2003 | Bauder et al. | |
| 2004/0202134 A1 | 10/2004 | Khawand | |
| 2005/0157670 A1 | 7/2005 | Tang et al. | |
| 2006/0013435 A1 | 1/2006 | Rhoads | |
| 2006/0158254 A1 | 7/2006 | Johnson et al. | |
| 2006/0160495 A1 | 7/2006 | Strong | |
| 2006/0173364 A1 | 8/2006 | Clancy et al. | |
| 2007/0160156 A1 | 7/2007 | Melzer et al. | |
| 2007/0294738 A1 | 12/2007 | Kuo et al. | |
| 2008/0018427 A1 | 1/2008 | Ezra et al. | |
| 2008/0056713 A1 | 3/2008 | Cooper et al. | |
| 2008/0062888 A1 | 3/2008 | Lusky et al. | |
| 2008/0109504 A1 | 5/2008 | McDonald | |
| 2008/0140823 A1 | 6/2008 | Thompson et al. | |
| 2008/0144582 A1 | 6/2008 | Das et al. | |
| 2008/0151974 A1 | 6/2008 | Jensen et al. | |
| 2008/0170853 A1 | 7/2008 | Rakib et al. | |
| 2008/0187027 A1* | 8/2008 | Malladi | H04B 1/713 375/135 |
| 2008/0193137 A1 | 8/2008 | Thompson et al. | |
| 2009/0088093 A1 | 4/2009 | Nentwig | |
| 2009/0110033 A1 | 4/2009 | Shattil | |
| 2009/0122846 A1 | 5/2009 | Kolze et al. | |
| 2009/0135850 A1 | 5/2009 | Hong et al. | |
| 2009/0213737 A1 | 8/2009 | Potter | |
| 2009/0268751 A1 | 10/2009 | Pantelias et al. | |
| 2010/0008230 A1 | 1/2010 | Khandekar et al. | |
| 2010/0329365 A1 | 12/2010 | Li et al. | |
| 2011/0026423 A1* | 2/2011 | Quigley | H04L 5/003 370/252 |
| 2011/0116561 A1 | 5/2011 | Yoo et al. | |
| 2012/0164950 A1 | 6/2012 | Nentwig | |

OTHER PUBLICATIONS

Extended European Search Report—EP 11165006.5—dated Mar. 11, 2013.
CA Office Action—CA Applicatio No. 2739234—dated Jan. 31, 2017.
Jan. 25, 2018—Canadian Office Action—CA 2,739,234.

* cited by examiner

| | Tone j | | | Tone j+1 | | | ... |
|---|---|---|---|---|---|---|---|
| Device i | Status | Modulation | FEC | Data Rate | Status | Modulation | FEC | Data Rate |
| Device i+1 | Status | Modulation | FEC | Data Rate | Status | Modulation | FEC | Data Rate |
| ... | | | | | | | | |

MANAGING UPSTREAM TRANSMISSION IN A NETWORK

CROSS-REFERENCE TO RELATED APPLICATIONS

This application is a continuation of and claims priority to U.S. patent application Ser. No. 17/337,844, filed Jun. 3, 2021, which is a continuation of U.S. patent application Ser. No. 16/701,906, filed Dec. 3, 2019 (now U.S. Pat. No. 11,057,147), which is a continuation of U.S. patent application Ser. No. 14/482,765, filed Sep. 10, 2014 (now U.S. Pat. No. 10,530,520), which is a continuation of U.S. patent application Ser. No. 12/776,584, filed May 10, 2010 (now U.S. Pat. No. 8,867,561), each of which is hereby incorporated by reference in its entirety.

TECHNICAL FIELD

The features described herein generally relate to managing access to a shared transmission medium, such as upstream transmissions in a content distribution or data network.

BACKGROUND

Conventional data networks, such as hybrid fiber coaxial cable networks, optical fiber or coaxial cable networks, wireless networks, satellite networks, and the like, allow one or more devices to communicate with one another, often times sharing access to a common transmission medium. In the example network depicted in FIG. 1, a central office 100 (e.g., a content provider, headend, etc.) may be connected to a distribution network over nodes 101a-b. Various homes 102a-f may be connected to the network, and may receive signals carrying content from the central office 100. The content may be, for example, television programming and movies received from content providers, stored at the central office 100 or received from another source using an external network (e.g., an Internet Protocol backbone network, a satellite network, etc.). The signal loss over fiber optic cable is much less than the loss over coaxial cable, thus the fiber optic connection between the central office and the fiber node 101A is often very long (e.g., 10 to 40 km). The signals over coaxial cable are much easier to split and amplify and terminate than fiber optic cable, thus the final connection from the fiber node 101A to the customers home devices is typically done with coaxial cable.

The central office 100 may offer downstream signals carrying this information (as illustrated by the arrows in FIG. 1). The central office 100 may also receive upstream communications from the various homes 102a-f. For example, in one type of system under the Data Over Cable System Interface Specification standard (DOCSIS), the available bandwidth on the distribution network is divided by frequency range into a downstream portion and an upstream portion. Most of the frequency allocation is in the downstream direction (e.g., 54-860 MHz), while a smaller portion (e.g., 5-42 MHz) is allocated for upstream transmissions. Since the various homes 102a-f need to share the transmission medium for their upstream transmissions, the DOCSIS standard calls for that sharing to be controlled by a termination system, such as a Cable Modem Termination System (CMTS) at the central office 100. Under DOCSIS, the CMTS instructs the various homes 102a-f (or, the cable modems in those homes) on when they can use the upstream bandwidth.

The centralized approach in DOCSIS allows for the centralized management of the upstream bandwidth, but it has a disadvantage. Upstream transmissions to a given CMTS are carried on a selected frequency channel within the 5-42 MHz upstream allocation, but the entire 5-42 MHz range is not used by all homes, because some homes suffer interference within that range. For example, home 102a may be located near a source of electromagnetic interference in that range, while home 102f may need to traverse a longer geographic distance, and pass through more splitters 101a-c, to reach the CMTS (resulting in greater loss of signal in different ranges), suffering interference along the way (particularly at the lower ends of the upstream range). Other homes, however, might not suffer these drawbacks. Some homes 102d might be geographically closer to the central office 100 and its CMTS, some 102b-c may have fewer intervening splitter nodes, and others 102e may have an intervening fiber optic portion 104 that allows signals to avoid much of the interference that would otherwise be suffered along the path of the fiber optic cable. Some of these homes may be able to use other frequency portions that are not within a chosen DOCSIS upstream channel.

There is an ever-present need to offer greater data transmission capability to end users.

Furthermore, the upstream channel may be nonlinear, and that may present issues for transmission. Most other media for communication are linear, such as twisted pair, satellite, and wireless. In hybrid fiber coaxial (HFC) networks, for example, the conversion from coaxial cable to fiber optic cable in the upstream requires an optical laser transmitter to be placed in the transmission path between modem transmitter and modem termination system receiver. This leads to nonlinear distortion in the HFC upstream channel that is not present in most communications systems. Also, since the upstream spectrum allocation is so low in frequency, 5-42 MHz, there is very little signal attenuation in the upstream. Most communication systems have a flat noise response over the communications channel such as wireless systems or a noise response that gets worse at higher frequencies such as DSL. In these systems the primary noise determinant is the signal attenuation and the receiver noise floor. In the HFC upstream, the noise is worse at lower portions of the spectrum since the noise level tends to decrease with higher frequency but the signal level stays relatively flat. Since the upstream is amplified often in the HFC upstream path and the fiber optic link has very little attenuation, the noise floor is not determined by signal attenuation and receiver noise floor. In the HFC return path channel, the signal-to-noise ratio tends to improve as the frequency increases and is fundamentally determined by external noise sources, upstream modem transmit power limitations, return path amplifiers and filters, and the noise and distortion characteristics of the optical return path laser transmitter in the fiber node.

SUMMARY OF THE DISCLOSURE

Features described herein allow for an alternative approach to managing upstream bandwidth, and one that may offer greater bandwidth capacities and at higher reliability than is currently available. In some embodiments, the modems may transmit over the entire available upstream spectrum, thus fully utilizing the spectrum dedicated to upstream transmission. Many modems can share the upstream spectrum using a combination of time division, frequency division, and code division. The spectrum may first be divided into sub-channels, with each sub-channel including three types of tones: data tones, ranging tones, and pilot tones.

Use of the tones may be managed by a centralized server or modem termination server, such as the CMTS in DOCSIS. The central server may provide the various modems with a map identifying the various tones. Along with the map, the central server may provide the modems with a schedule, according to which the modems may transmit a pilot signal on one or more of the tones. The schedule may require each modem to progressively step through the various tones, transmitting pilot signals on each tone for a predetermined amount of time, so that over a longer period of time, the modem will have eventually transmitted pilot signals on all (or a defined subset) of the possible tones. Viewed over time, the subset of tones carrying pilot signals may be a moving subset, stepping through the various tones.

The centralized server may record the various results of the pilot signals from each modem, and measure distortions, and it may transmit acknowledgement and predistortion signals back down to each modem, informing the modem that the last pilot signal was received and how future transmissions on the tone should be predistorted. With this feedback, each modem may adjust the symbol/modulation rate it would use on that particular tone, and the centralized server may record the maximum data rate that a particular modem can achieve when transmitting on a particular tone. The server may then use this information to determine how best to allocate tones when modems need to transmit upstream data, and the adaptive modulation may allow for the most efficient use of the various tones. The adaptive modulation and pilot signal information may also allow the modem to pre-distort upstream transmissions to account for linear and nonlinear distortion occurring on the tone.

In some embodiments, the pilot signal schedule for a given modem may result in the modem continuously transmitting pilot data, hopping the transmission from tone to tone according to the schedule. Requests for upstream tone allocation may be added to the pilot signal, allowing the pilot signals to be multi-purpose. Additionally, this hopping may intentionally skip some tones, allowing for a given pilot signal on a tone to also define characteristics of neighboring tones.

These features, and others, may be offered using one or more of the embodiments described in greater detail below.

BRIEF DESCRIPTION OF THE DRAWINGS

FIG. 6 illustrates contents of an example adaptive modulation tone map.

DETAILED DESCRIPTION

Figure 1:
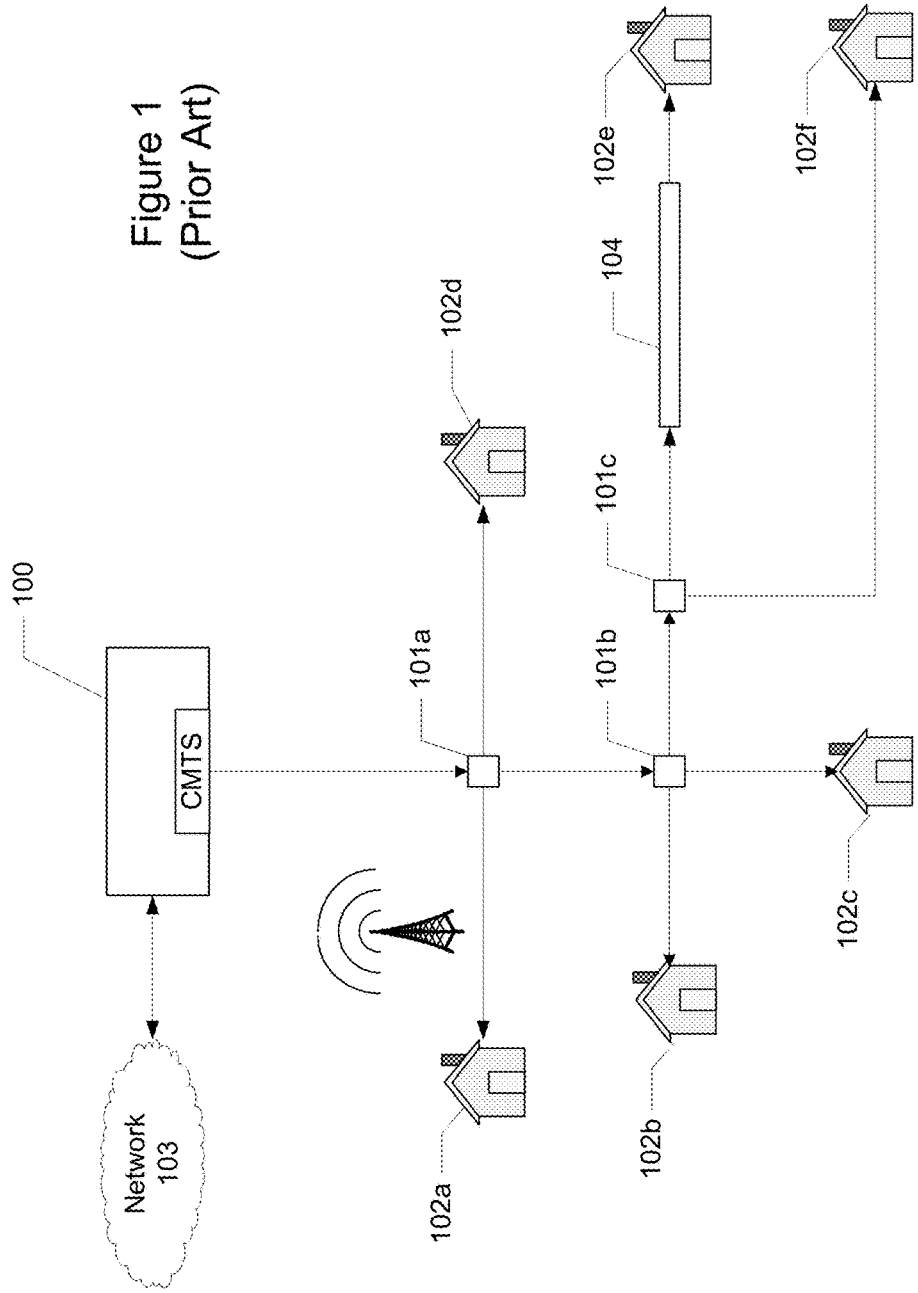
FIG. 1 illustrates a data distribution network on which the various features described herein may be implemented.
Figure 2:
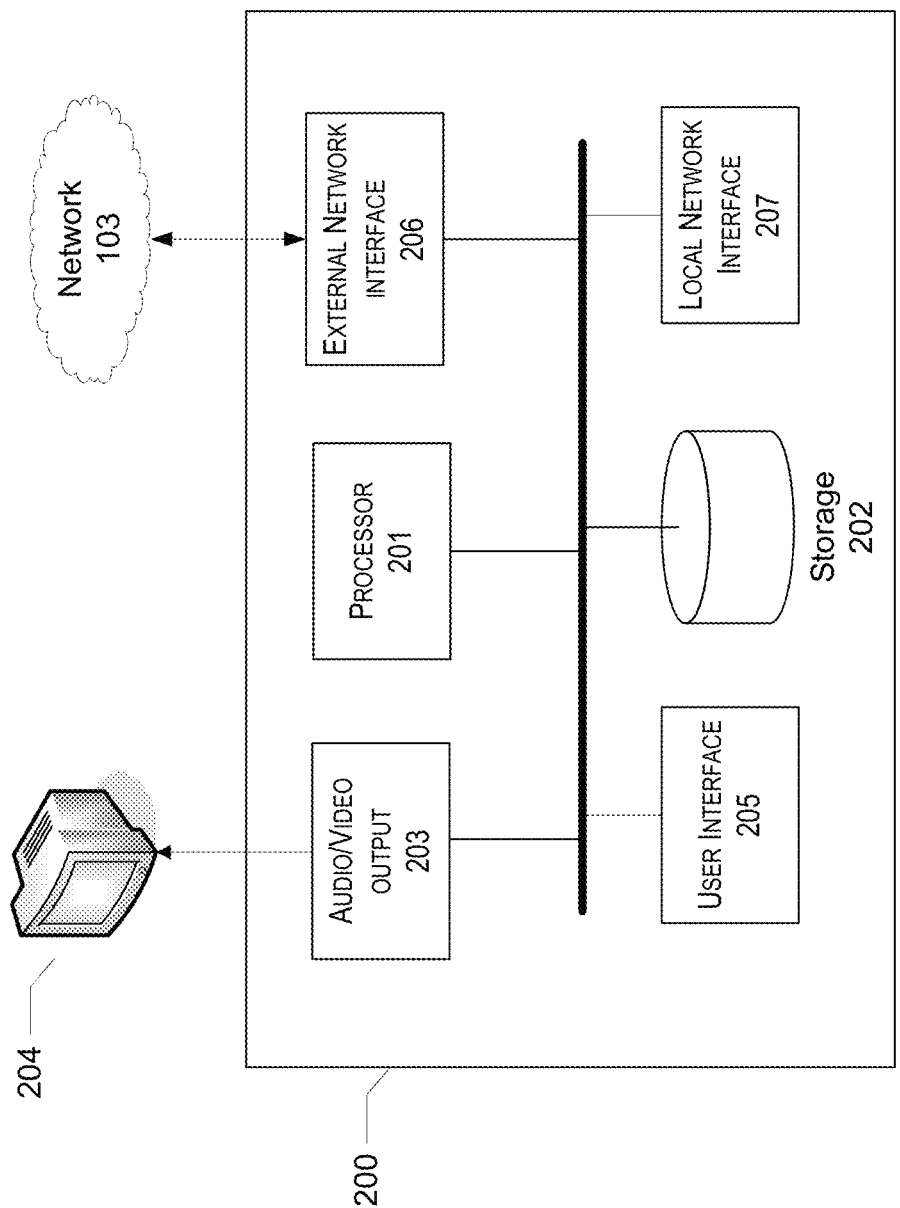
FIG. 2 illustrates a computing device that may be used to implement the various components described herein.

FIG. 2 illustrates an example computing device 200 that can be used to implement the various structures and components described herein, such as a gateway or interface device at a user's home, a modem, and a modem termination server. The device 200 may include one or more processors 201 that may execute software programs or instructions to perform functions described herein. The programs and instructions may be stored in a storage 202, which may be any desired type of computer-readable medium. For example, storage 202 may be a hard disk, floppy disk, compact optical disk, FLASH memory (internal and/or removable), or any other desired type of storage. The device 200 may include an audio/video output circuit 203, which may be any desired type of audio and/or video circuitry that can send output to a device 204, such as a monitor. For example, the audio/video circuit 203 may include an HDMI (High Definition Multimedia Interface) interface circuit, component video output, VGA (Video Graphics Array) video output, stereo audio output, textual information displays, etc.

The device 200 may also include user interface circuitry 205 that can provide any desired interface to a user. The interface may include displays (such as the monitor 204), LED (light-emitting diode) displays, pushbuttons, microphones, infrared sensors, and/or any desired type of user interface device that will allow a user to interact with the device 200.

The device 200 may also include connectivity for networks. One or more external network interfaces 206 may be included to permit the device to communicate with external networks that are off-site (e.g., outside of the premises on which the device 200 resides). These interfaces may include, for example, hardware and/or software for cable modems, fiber optic interfaces, twisted-pair telephone wire interfaces, wireless cellular interfaces, wireless mesh network interfaces, WiMAX (Worldwide Interoperability for Microwave Access) interfaces, satellite interfaces, and any other desired type of external network interface.

The networks need not be external to a premises of the device 200. The device 200 may include one or more local network interfaces 207 to allow communications with on-premises networks as well. Such local network interfaces can include local wireless (e.g., IEEE 802.11) interfaces, local wired (e.g., Ethernet) interfaces, and any other desired interface for an on-premises network.

Figure 3:
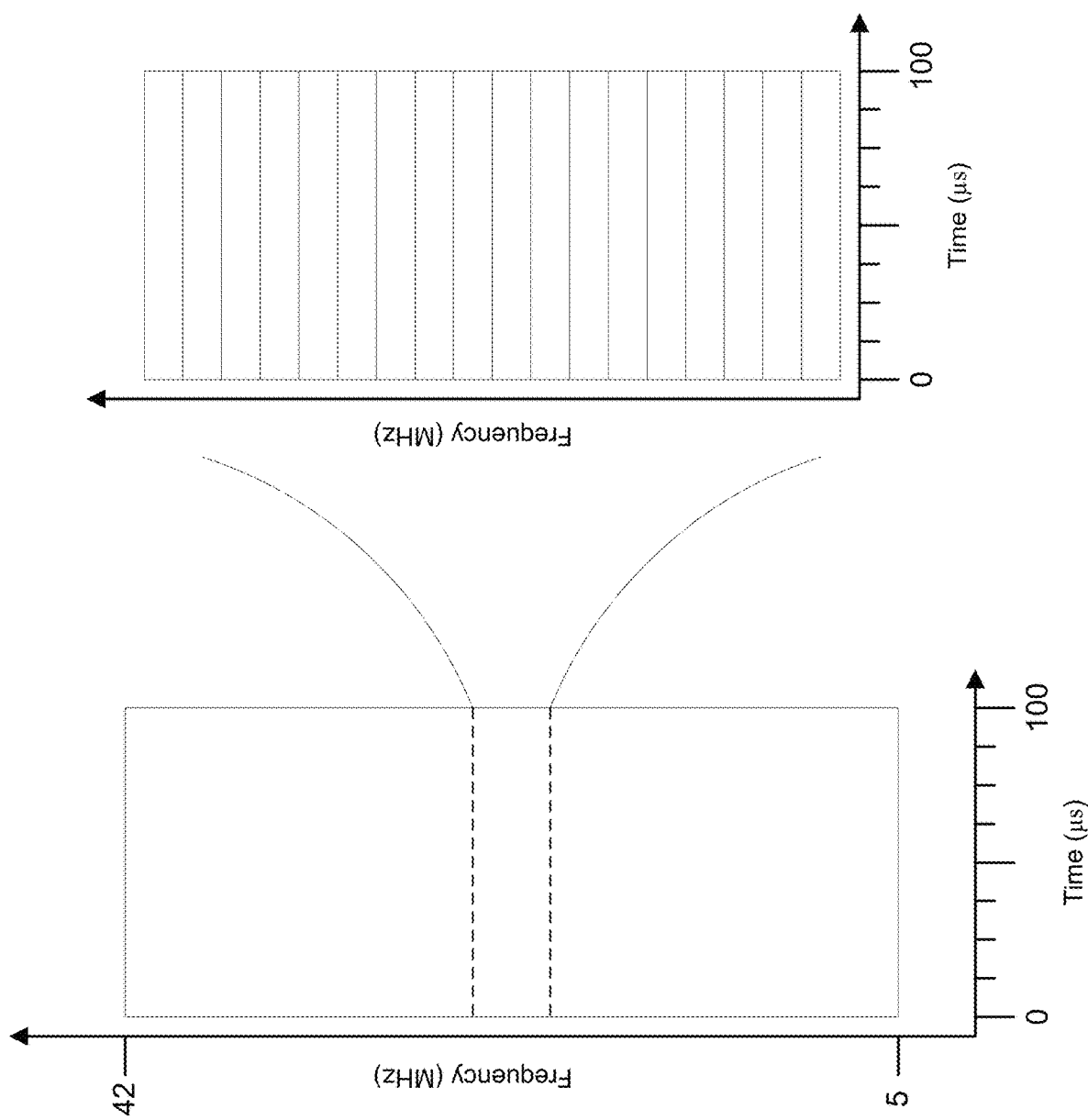
FIG. 3 illustrates an example frequency distribution map showing the various tones that may be defined using features described herein.

FIG. 3 illustrates an example frequency map for the upstream portion of a network, illustrating the upstream frequency range (e.g., 5-42 MHz) for a time period of 100 microseconds. This frequency range may be divided into a number of discrete ranges, or tones. For example, individual tones may be defined at a 10.51136 kHz spacing, resulting in tones that occupy approximately 10.5 kHz bandwidth. Using this tone size, the 37 MHz overall upstream range depicted (5-42 MHz) can be divided into approximately 3,520 tones (37 MHz/10.51135 kHz). The right-hand side of FIG. 3 shows an expanded portion of the overall range, depicting 18 of these tones occupying a 189.2 kHz portion of the spectrum. As will be described below, each of these tones may be individually allocated to different modems, depending on how well the particular modem is transmitting on that tone, and on the modem's transmission needs.

In general, a modem may transmit data on a particular tone to a central controller (which may, in one type of network, be a CMTS implemented using a computing device as in FIG. 2). The modulation used by the modem on that tone governs how much data can be sent. For example, if Quadrature Amplitude Modulation (QAM) is used to send symbols representing data on the tone, then 256 QAM can convey an 8-bit quantity for each symbol. If there is too much noise or interference on that tone for that modem to adequately transmit 256 QAM, then it may use a lower-level modulation, such as 64 QAM, 16 QAM, or simple Quadrature Phase Shift Keying. The lower-level forms of modulation convey less information, but are more tolerant to noise and interference.

Figure 4:
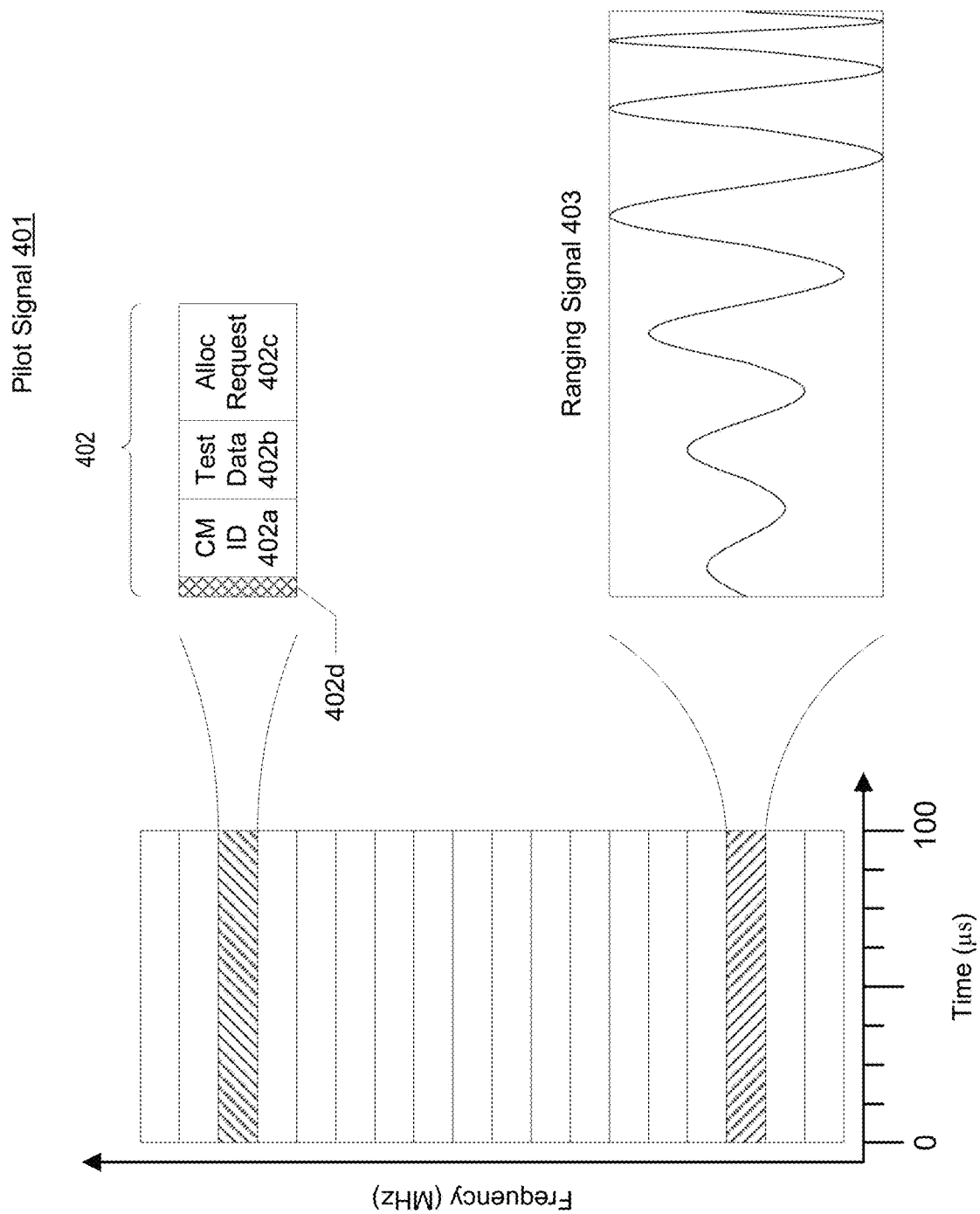
FIG. 4 illustrates example pilot and ranging signals.

To determine which modulation scheme a modem can use on a particular tone, the modem can be instructed to transmit a test signal, or pilot signal, on that tone using a predetermined modulation. FIG. 4 illustrates an example of a pilot tone 401 carrying a pilot signal packet 402. The pilot signal packet may contain data 402a identifying the transmitting modem and a test data pattern 402b that the receiver is expecting to receive. In some embodiments, the pilot signal packet may also include an allocation request 402c. The allocation request 402c will be discussed in greater detail further below. FIG. 4 also illustrates some additional guard time 402d that may be placed in the packet to allow microreflections to settle.

The transmission of the pilot signal packet may be made according to a predetermined modulation scheme. The pilot signal may measure the channel conditions, such as signal to noise ratio and symbol error rate by demodulating the pilot with a known symbol pattern and modulation rate. For example, the modem might first use the highest supported scheme (e.g., 256 QAM) for the transmission for a data tone if the pilot tone measurement has a high signal to noise ratio and a low symbol error rate. If the pilot signal is successfully received at the centralized server, then the modem is confirmed as being able to use 256 QAM on that tone. If the pilot tone signal measures a low signal to noise ratio and a high symbol error rate, then the modem may need to step down the modulation, choosing a lower-bandwidth, more noise tolerant, scheme and try again. This process is described in greater detail further below.

Over time, and according to a predetermined schedule, a given modem may eventually transmit pilot signals across all available tones, with each pilot signal being used to test whether a given modulation is effective at that tone for that modem. If a modem's pilot signal is not successfully received at the central controller, then the modem may retry the pilot signal, but at successively lower levels of modulation, until the pilot signal is successfully received at the central controller.

Some tones may also be used as a ranging tone to carry a ranging signal 403. Ranging signals may permit a central controller to detect and quantify distortions on signals transmitted from a modem caused by the intervening cable network between the central controller and modem. Example distortions include time delay (time from transmission to receipt), amplitude distortions (shifting in amplitude) and phase distortions (shifting in phase). The central controller may respond to the modem with the characteristics of the ranging signal that was received, and the modem may determine the timing delay and amplitude/phase distortions that occurred (e.g., by comparing the received information with time/amplitude/phase information identifying those characteristics of the ranging signal that the modem sent). Alternatively, the central controller may perform these calculations, in which case it would receive information from the modem identifying the characteristics of the original signal that was sent. The distortions may be determined for the base tone, and also on harmonics of the base tone, to allow the modem to compensate.

This compensation may be done, for example, by having the modem add pre-distortion to the transmission signal to cancel out the distortion. In this manner, pre-distortion increases the signal to noise ratio and the signal to interference ratio in the upstream channel, thereby increasing the channel capacity and allowing the channel to support higher orders of modulation. The ranging signal may simply be a transmission of the base carrier frequency for the tone (e.g., with no digital data modulated onto the tone). Alternatively, data may be modulated onto the ranging signal (e.g., identifying the transmitting modem, identifying characteristics of the ranging signal being sent, such as original time of transmission, amplitude and/or phase), and the receiving central controller would need to account for this data when determining the distortion/predistortion. In some embodiments, the pilot signals may be used as ranging signals as well.

The process of sequentially testing the various tones may help the central controller build a comprehensive table identifying the modulations level(s) that each modem is able to use on each tone in the system. Having each modem test each tone individually may be the most accurate approach, but it may also be processing intensive for the central controller to be monitoring so many pilot/ranging signals (e.g., the example above lists 3520 tones in the 37 MHz upstream range). To help streamline the testing and monitoring at the central controller, some embodiments may group the tones for testing purposes, and use pilot and ranging tones to represent characteristics of their neighboring tones. For example, a single pilot tone might be used to represent 108 other neighboring tones, on the assumption that the neighboring tones will share similar interference and signal characteristics. Similarly, a single ranging tone might also be used to represent 108 other neighboring tones, on the assumption that ranging and distortion for the neighboring tones will be similar to that of the ranging tone. With such groupings of 110 tones (108 data tones, one pilot tone, one ranging tone), the 3,520 available tones in the example above may be checked using 32 pilot tones and 32 ranging tones (3520/110=32).

Figure 5:
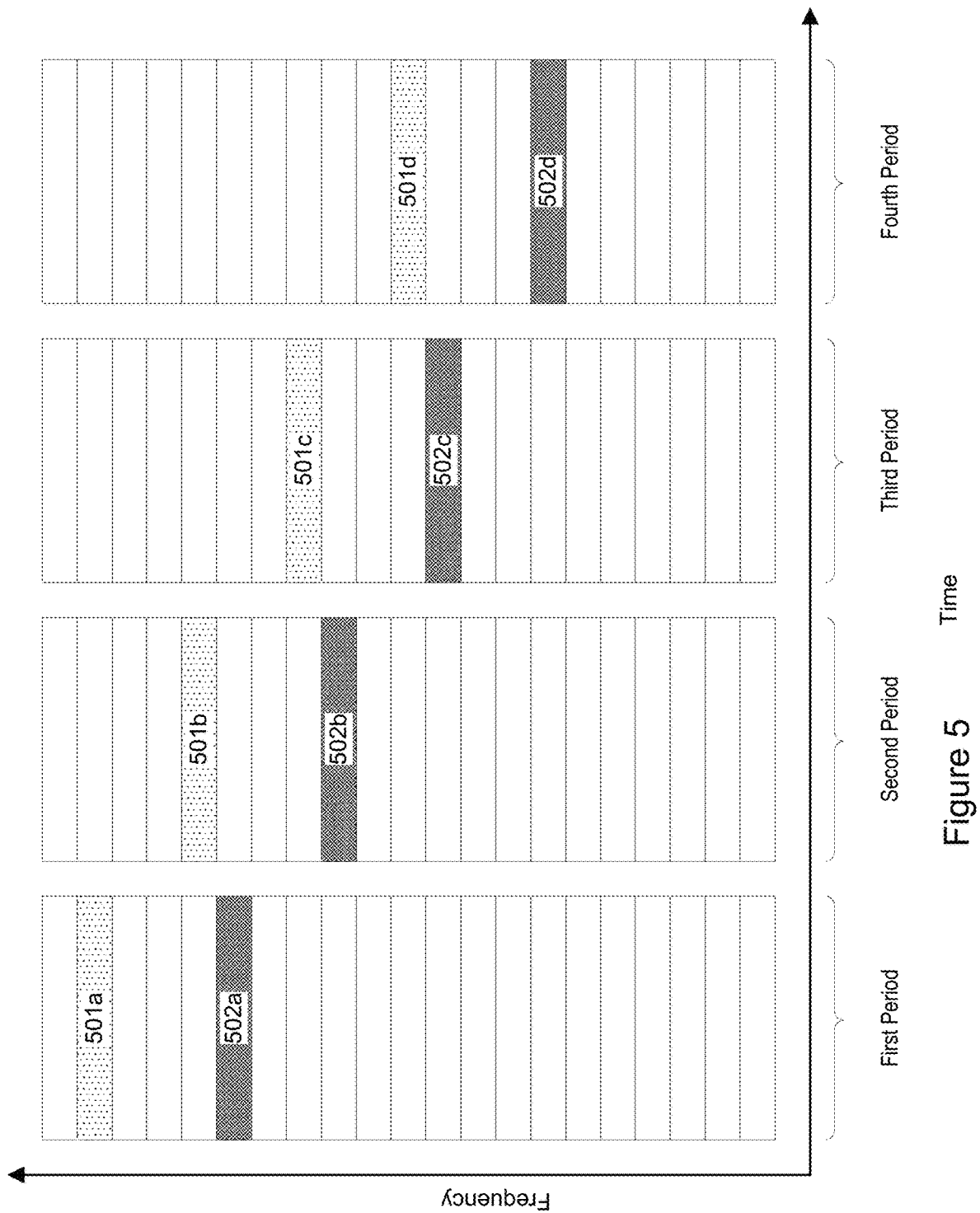
FIG. 5 illustrates a frequency map over successive symbol periods.

As discussed above, the modems may transmit pilot and ranging signals on tones to allow the central controller to assess the modem's ability to use that tone. Each modem may transmit these signals on different tones at different times. FIG. 5 illustrates example frequency maps for four time periods, illustrating how the pilot and ranging tone transmissions can hop through tones over time. As illustrated, the modem may transmit pilot tone 501a and ranging tone 502a on the two tones illustrated during the first time period. In successive time periods, the modem may transmit its pilot tone 501b,c,d and ranging tone 502b,c,e on different tones in the frequency map. Within each time period, the central controller may receive these pilot and ranging tones, and may determine the modem's ability to use those tones (as will be described in greater detail below). The transmission schedule may result in the modem transmitting a pilot and/or ranging tone every symbol period, so that each modem is always transmitting one of these test signals.

The duration of the illustrated time periods in FIG. 5 may be a single symbol period (e.g., long enough to transmit a single symbol using a desired modulation, such as 256 QAM). For example, a 100-microsecond symbol period may be chosen. That rate allows for 10,000 symbols per second, and if 256 QAM is used as the modulation, then a given tone can support a data rate of 80,000 bps. Following the example having 3520 tones grouped into 110-tone groups, and assuming that the 32 pilot and 32 ranging tones in each group are not used to carry data, then the 256 QAM supports a total upstream bandwidth of 276.48 Mbps ((3520 total tones−64 pilot/ranging tones)*80,000 bps/tone). The 100-microsecond symbol period is also convenient for alignment with symbol periods of legacy modems, such as DOCSIS 1.0 and 2.0 modems, as will be discussed further below.

The FIG. 5 illustration shows only four time periods, but many time periods may be used to allow the modems to eventually transmit the pilot and/or ranging signals on all of the tones in the system. Additionally, a modem may transmit a pilot or ranging signal on a first tone at one time period, and then in a later time period, it may transmit on the same tone again. Such retransmission may be useful to confirm that the modem is still able to use that tone, or to try a different modulation level to determine whether a lower/higher data modulation rate is supported by the modem on that tone.

The actual manner in which a modem steps through the various tones may vary. In some embodiments, the central controller may transmit instructions to the various modems, informing them of which tones to use for pilot and/or ranging signals, when to use those tones, and what modulation to use on those tones. These instructions may result in the modem transmitting a pilot and/or ranging signal during every time period. Such continuous transmission (although across different tones) of the pilot signal may, for example, allow the modem to have an immediate mechanism for transmitting an upstream signal (such as a request for tone allocation) to the central controller.

In other embodiments, the central controller may transmit a schedule or algorithm that may be used to dynamically determine when the next pilot or ranging signal should be sent, and on what tone. The schedule may indicate times and tones, while the algorithm may include dynamic instructions. For example, the instructions may instruct the modem to repeat a given tone for a number of times (e.g., ten times), and if the signal is successfully received at a given modulation 9 out of 10 times, then try the next higher level of modulation. The conditions for stepping down may be based on the desired effective rate. For example, the modem might try a given modulation ten times, and lower the modulation if more than 1 fails. The adaptation map can be updated to indicate the next modulation that should be tried on the next pilot signal sent by the modem.

The ranging tones may measure the time delay, frequency offset, attenuation, AM to AM and AM to PM non-linear distortion for each frequency slot in the 5-42 MHz upstream band (or whatever the upstream spectrum allocation is, not necessarily always 5-42 MHz). The ranging tone measurements are not expected to vary significantly over time or frequency from observations of upstream channel characteristics. Thus the sequence of ranging tones is not critical to operation and so the sub-channel of a given modem may be assigned based upon other criteria described below and the tone assigned for ranging within the sub-channel can linearly progress from lowest frequency to highest frequency and then repeat.

In some embodiments, there may be just one ranging tone per sub-channel and only one modem per ranging tone. Within an example sub-channel there are 110 possible center frequencies available for the tones. When a modem is assigned a ranging tone within a sub-channel for the first time, the lowest frequency may be assigned, f_subchannelx_0. The next time this modem is assigned a ranging opportunity on that sub-channel then the ranging tone center frequency may be the next highest frequency tone, f_subchannelx_1. This process may continue until the highest possible center frequency within the sub-channel is reached, f_subchannelx_109.

The next ranging tone within the sub-channel in the sequence can be f_subchannelx_0. The ranging process can use many symbols, and a full ranging process may vary in terms of the number of symbols required to complete ranging. For non-linear ranging, multiple harmonic ranging tones can be used.

In general as many modems will range as possible and over a long period of time. Each modem can have an equal number of ranging opportunities. For example, with 128 modems served and 32 ranging tones, the modems can be grouped into four sets of 32 modems, linear_ranging_group_1, linear_ranging_group_2, linear_ranging_group_3, linear_ranging_group_4. First, members of linear_ranging_group_1 can each be assigned a different ranging tone and sub-channel, and they can complete the full linear ranging process. Then members of linear_ranging_group_2 can complete the linear ranging process, and so on until the first group will complete another ranging process. Non-linear ranging can be performed one modem at a time, and thus with 128 modems each modem can take a turn at nonlinear ranging every $128^{th}$ non-linear ranging opportunity.

Pilot tones can measure the noise and interference levels within each sub-channel and tone bandwidth. The noise and interference levels may vary significantly over time and frequency. For this reason there are times when pilots should be concentrated in frequency bands that have demonstrated a history of varying interference. These tend to be concentrated in the lower portion of the spectrum and at frequency bands used in radio communications. In one example configuration, there are 32 sub-channels and 1 pilot per sub-channel and 4 modems per pilot tone. Thus 128 modems can send a pilot tone at the same time. If only 64 modems are served, then each can send multiple (e.g., 2) continuous pilot tones, since it is desirable to send as many pilot tones as possible to get a better measurement of channel conditions over frequency and time.

The modems served can be randomly and evenly distributed over 32 sub-channel assignments groups, such as groups going from zero to 31. For example, modem_0, modem_1, modem_2, modem_3 can be assigned to sub_channel_assignment_group_0 while modem_124, modem_125, modem_126, modem_127 can be assigned to sub_channel_assignment_group_31.

The lowest frequency sub-channel can be designated as sub_channel_0, and the highest frequency sub-channel can be designated as sub_channel_31. The four modems in sub_channel_assignment_group_0 can be first assigned to sub_channel_0 for enough symbol periods to transmit a pilot transmission (e.g., eight symbol periods may be needed in some embodiments). Then, the four modems in sub_channel_assignment_group_0 can be assigned to sub_channel_1 for the next eight symbols. This can continue until sub_channel_assignment_group_0 is assigned to sub_channel_31, and after that sub_channel_assignment_group_0 can be assigned to sub_channel_0 again and the process can be repeated.

Likewise, sub_channel_assignment_group_1 to sub_channel_assignment_group_31 can step through the sub-channels. Within the sub-channel, the pilot tone center frequency can linearly progress from lowest frequency to highest frequency. However, over time patterns of interference can be recorded that will alter the assignment of pilot tone center frequencies within a sub-channel. Once a statistical measurement of the interference level within a sub-channel has been measured, then the assignment of pilot tone center frequency within a sub-channel can be based upon the level and probability of interference. For example, if during the hours of 6 pm to 8 pm a groups of tones within a sub-channel has a 90% probability of interference above a threshold level while the other tones have a 10% probability of interference above a threshold level, then the pilot tones can be assigned 9 times to the groups of tones suffering high interference for every 1 time that the pilot is assigned to a group of tones with a history of less interference.

Data tones can be assigned to modems based upon upstream bandwidth requests. If only one modem has requested upstream transmission, then all data tones can be assigned to that modem. In the illustrative example, if all 128 modems request upstream transmission, then a subset, such as 27 data tones, can be assigned to each modem. Higher level quality of service metrics can be applied to determine how quickly a bandwidth request from upstream transmission is assigned data tones.

As the various modems in the system transmit their pilot and/or ranging signals, the central controller may store information identifying signal quality characteristics on a per-modem and per-tone basis. FIG. 6 illustrates an example adaptive modulation map that the central controller may have access to, or record in a memory. For each device/tone combination, the adaptive modulation map may store tone usage information for that device (e.g., modem) and tone. For example, the tone usage information may include information identifying a status of the particular tone and device (e.g., whether the device is active), the particular modulation that the device should use on that tone (e.g., 256-QAM), the amount/type of forward error correction (e.g., error correction codes, predistortion, etc.), the overall data rate on the tone (which may simply be the modulation rate, or may take into account other factors).

Figure 7:
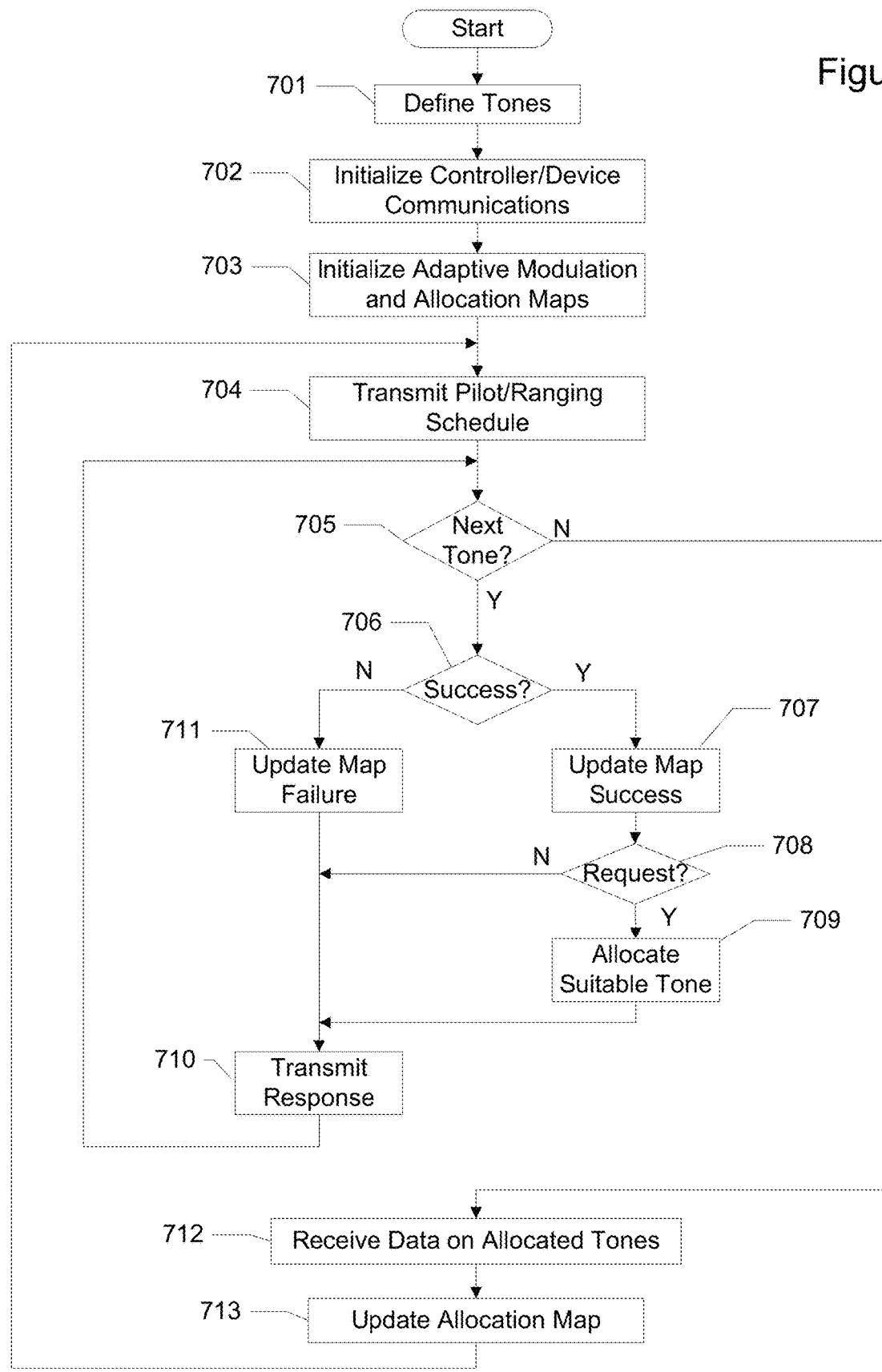
FIG. 7 illustrates an example process of managing discrete tones.

FIG. 7 illustrates an example process, which may be performed by the central controller, for implementing the features described above. This process may be performed, for example, at a modem termination system acting as the central controller. In step 701, the process may begin with the central controller defining the various tones that will be used. This may include, for example, determining the frequency width, positioning and timing of the tones, such as the 10.5 kHz, 100-microsecond long periods in the example above.

In step 702, the controller may initialize communications with the various devices (e.g., modems). This may be accomplished, in one type of network for example, via DOCSIS initialization of cable modems, through which the CMTS learns of the presence of the various modems, such as cable modems, that are present on the network.

In step 703, the controller may initialize an adaptive modulation map for the various modems on the network. The initial adaptive modulation map may include predetermined default values for the modems. For example, the modulation value may be initially set at the highest supported modulation rate (e.g, 256-QAM). The controller may also initialize an allocation map, which can identify the various tones and their usage, such as the times during which the tones are going to be in use. For example, the allocation map might indicate that tone 'B' has been reserved to modem '01342f33' for time periods 11 and 12.

In step 704, the controller may transmit a pilot signal/ranging signal schedule to the various modems in the system. This schedule may identify, for each or a particular modem, the times and tones on which that modem is supposed to transmit a pilot signal and/or ranging signal.

In determining which tones to use as pilot or ranging signal tones, the controller may first avoid identifying any tones that have already been allocated to a modem for upstream transmission (e.g., the controller may limit its schedule to unused tones), and may also determine which tones need testing again (e.g., if a modem has never transmitted a pilot on a particular tone, or if its last pilot on the tone was not successful, the controller may need that modem to try that tone again before trying another tone).

In step 705, the controller may begin to monitor the various tones that were supposed to carry pilot and/or ranging signals from modems, and check to see if there is a pilot/ranging tone that is expected and not yet checked for successful receipt. If a tone remains to be checked, then for the next tone, the controller may determine, in step 706, whether that tone was successfully received.

If it was, then the controller may update the adaptive modulation map in step 707 to indicate the success. This update may also include updating/generating information indicating the next tone and modulation level that the modem is to use for sending the next pilot/ranging signal. The controller may store such information, and testing history, in the adaptive modulation map, and may use that information when scheduling future pilot tones for the given modem. Or, as noted above, the modem can be programmed with a predetermined algorithm to automatically determine the next modulation level to use based on this same information, in which case any needed information may be supplied from the controller as a response to the modem's pilot or ranging signal.

In the case of a ranging tone, if the ranging tone is successfully received, then the controller can provide information identifying the characteristics of the ranging signal that was received (e.g., time of receipt, phase, amplitude, etc.), and let the modem determine how best to compensate for it. Alternatively, the controller may analyze the received signal and compare it against an expected signal (e.g., the pure carrier for the tone, or a predetermined data value that was to be sent in the ranging tone), to identify the amount of distortion. This distortion may then be used to compute the amount/type of linear and/or nonlinear predistortion needed to cancel out the distortion, and information storing this predistortion may be stored in the adaptive modulation map as a distortion profile, and subsequently used to instruct the modem to predistort its signal (e.g., the predistortion data may be transmitted with the schedule in step 704). Examples of this predistortion are discussed in greater detail below.

If the signal was successfully received, the process may then determine 708 whether a request for allocation was included in the signal. If it was, then the process may proceed to step 709, and one or more available tones may be allocated to the requesting modem. The allocation may be for a fixed duration (e.g., an allocation for ten symbol periods, 200 μs, 800 μs, etc.), and may be based on criteria included in the modem's request. For example, the request may identify the amount of upstream bandwidth desired by the modem, the duration of the bandwidth, and any requests regarding specific tones (e.g., if the modem wishes to request a particular tone) or modulation (e.g., if the modem wishes to use a particular modulation type). The controller may determine the tone(s) to allocate by consulting another allocation map, which may be a table listing the various tones and identifying the ones that are in use (and other details, such as the duration of the use, the modem using it, the modulation on it, etc.), and identifying an available tone from the adaptive modulation map that can support the desired modulation. For example, if the request indicates that the modem would like to transmit at a rate of 100 bits/second, then the controller may consult the allocation map to identify tones that are not already in use, and the adaptive modulation map to identify available tones that, for the requesting modem, can support the required modulation level to provide the requested data transmission rate. The central controller may then prepare and transmit a downstream response 710 to the requesting modem to acknowledge receipt of the signal, and to provide allocation details, such as allocated tone(s) and duration.

The response may be transmitted on a separate downstream channel from the upstream tones (e.g., DOCSIS downstream channel in one type of network), and may indicate whether the signal was successfully received, and/or the signal characteristics of the received signal (similar to the response to ranging signals, with the time of receipt, amplitude, phase, etc.). Additionally, the response may indicate the type of modulation to try next on this tone, although that information may alternatively be provided as part of the schedule above, or the selection of the next modulation may be automatically performed according to a predetermined algorithm.

If, in step 706, the expected pilot and/or ranging tone was not successfully received, then the controller may update the adaptation map in step 711 with failure information. Such a failure update may indicate the tone and modulation that was attempted, and may also include a determination of what tone and modulation to expect in the next pilot/ranging signal from the same modem. After processing the failure, the controller may also send a response to the modem, although this response might simply indicate that no signal was received, or identify the signal characteristics (timing, phase, amplitude, etc.) of whatever signal was actually received on the tone. In some embodiments, the failure to receive a signal does not result in a response or acknowledgement message—the lack of such a response may be treated by the modem as an indication that the signal was not received.

After transmitting a response (if any), the controller may then return to step 705 to consider the next expected pilot tone, which may be from a different modem. If no more pilot/ranging tones are expected, then the process may proceed to step 712, and process the various tones that had previously been allocated and which now carry upstream data. When the upstream data has been received, the controller may then update the allocation map in step 713 to remove allocations that are no longer needed (e.g., the modems that have finished their transmissions, or whose allocations have expired), and the process may return to step 704 to begin another round of pilot/ranging signal scheduling and transmission.

The process shown in FIG. 7 is just an example to illustrate concepts, and variations are certainly possible. For example, the illustrated process includes transmitting the schedule for each round of pilot/ranging signals (e.g., once for each time period illustrated in FIG. 5). This is not required. As an alternative, the schedule could be transmitted less frequently (e.g., and include information and/or algorithms scheduling signals for future time periods). Also, the sequence of steps may be changed. For example, the receipt of actual content on allocated tones (712) may occur simultaneously with the receipt of the pilot/ranging tones. Other variations, such as the removal, combination, rearranging, and/or addition of steps, may also be implemented as desired.

Figure 8:
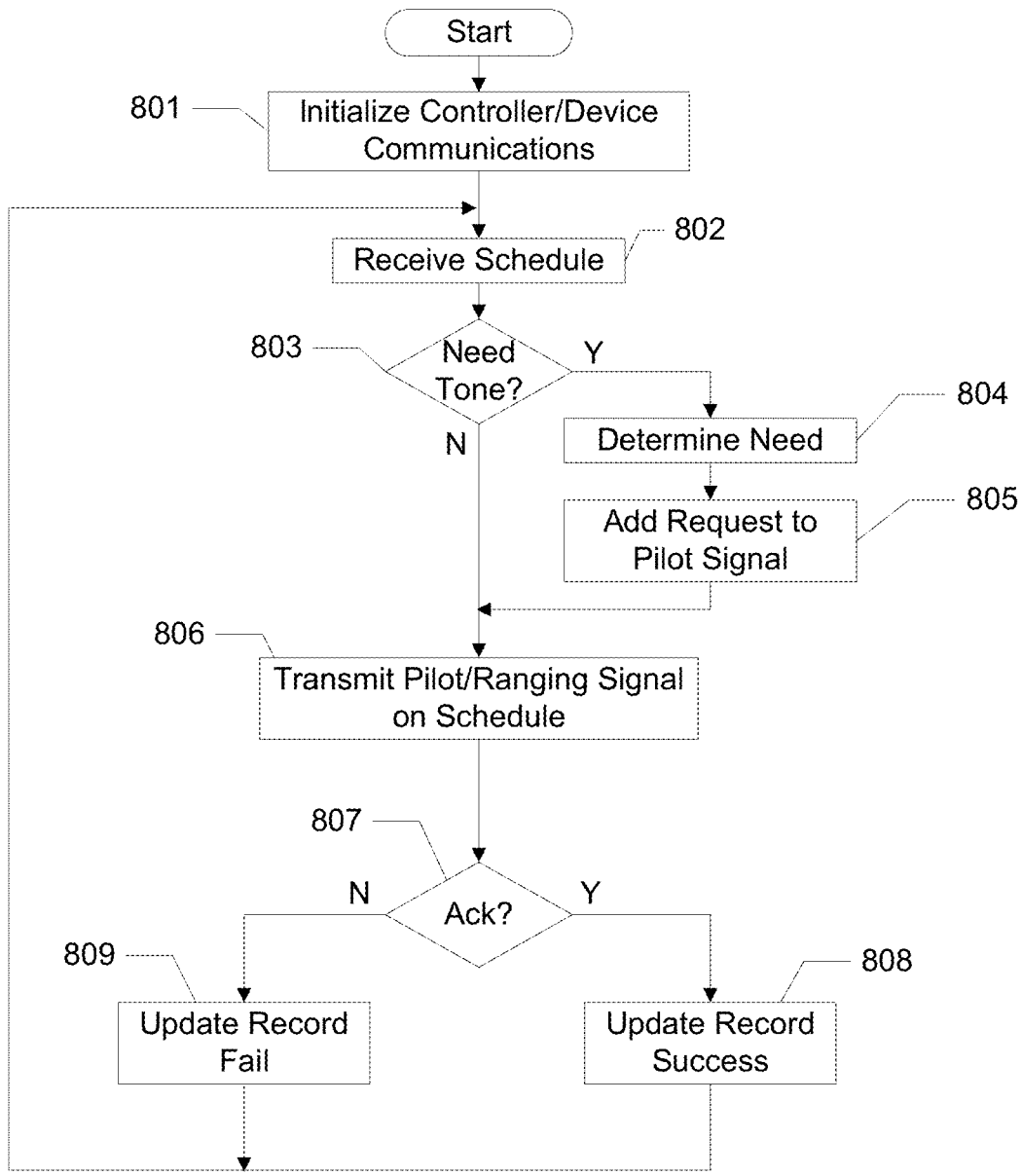
FIG. 8 illustrates an example process of a modem using tones described herein.

FIG. 8 illustrates a process of using tones, from the perspective of the end device (e.g., the modem). In step 801, the device may first establish communications with the central controller, similar to step 702. In step 802, the device may receive the schedule transmitted by the controller in step 704, and may prepare itself to transmit the pilot or ranging signal information on the tone identified in the schedule, and using the modulation identified in the schedule. This may involve, for example, generating the pilot signal packet for transmission at the appropriate time.

In step 803, the device may determine whether it needs to transmit upstream data. If it does, then in step 804, it may determine the amount of need for the request. This may include, for example, identifying the data transmission amount, rate, duration, type, etc. that is needed. In step 805, the request and any needed request identification information may be inserted into the pilot signal that is about to be transmitted. In some embodiments, the device may be scheduled to transmit a pilot and/or ranging signal on every time period (e.g., continuously), so the request can simply be added to the next outgoing signal without requiring a separate contention to make the request.

In step 806, the device may transmit the next pilot, ranging, and/or data signal at the designated time and using the designated modulation (according to the schedule).

In step 807, which may occur after sufficient time has elapsed for the central controller to respond, the device may check to see if the pilot, data, and/or ranging signal has been acknowledged by the controller. The acknowledgement may arrive on any desired downlink channel, such as an MPEG stream in a DOCSIS downstream channel. The acknowledgement may contain information identifying the characteristics of the signal that was received, to allow the device to measure the distortions that may have occurred in the signal path between the device and the central controller. These distortions, and the device's ability to offset them, are discussed further below.

The acknowledgement may also include information responding to the device's request for allocation (if one was included in the original pilot, data, or ranging signal). The response may include, for example, a simple indication that the request has been received and is being processed, or it may include a full response to the request such as a grant identifying the tone(s) and time(s) allocated to the requesting device, or a denial of the request with information identifying reason(s) for the denial.

If an acknowledgement has been received, then it may update its internal records in step 808 to reflect a successful transmission of the signal. This updating may include a determination of ramifications of the successful transmission. For example, the end device may be tasked with determining the modulation to be used on the next pilot signal, and it may make this determination in response to the acknowledgement. In some embodiments, both the central controller and the end device may have a predefined algorithm of changing modulation types, so that both the controller and the device know what modulation will be used next based on the success/failure of the previous pilot, data, or ranging signal. For example, both may have a hierarchy of modulations (e.g., 256-Qam, 64-Qam, 16 Qam, QPSK), and both may be configured to automatically choose, for a subsequent pilot or ranging signal transmission, the next sequential modulation in the hierarchy in response to a success or failure at the previous modulation. This chosen modulation may be the next one used when the device is required to send another pilot or ranging signal on the same tone.

A successful transmission may also result in a determination of the particulars for the next scheduled pilot, data, or ranging signal (e.g., which tone to use, when to send, etc.). For example, the schedule may indicate that if one modulation is successfully used on the tone, then the next data signal will use the next higher modulation (unless that higher modulation has recently failed). Alternatively, the schedule may simply compare the successful modulation with a needs database (e.g., comparing the successful modulation level with anticipated and/or historical need of the user to determine whether the successful modulation would be sufficient for this particular user, in which case the next pilot signal would be best used to test a new tone instead of testing a higher modulation level for the previous tone).

The main sources of interference tend to be from radio communications, such as short wave radio and impulse noise from electrical motors and lighting fixtures. These interference sources occur intermittently in both time and frequency. When a data tone is transmitted, there is a probability that interference at the time of transmission and at the frequency of the tone is such that the receiver cannot demodulate the signal correctly. If the signal is correctly demodulated then a positive acknowledgement of reception is sent from the central controller to the end device. If the signal is not correctly demodulated by the receiver, then a negative acknowledgement is sent from the central controller to the end device.

If the negative acknowledgment is received, then the transmitter can repeat the data with a random delay, hoping that the interference source has gone away. This can be repeated several times until a positive acknowledgement is received. Each repeated transmission can add more forward error correction to increase the chances of successful reception. After several unsuccessful attempts, the data can be sent on another tone that has been measured by a pilot tone to have better chances of reception. In some embodiments, data will not be sent on a tone that has many failed transmission attempts even at high forward error correction and low modulation rate, until a pilot tone has been used to verify that the source of interference has gone away.

After a successful transmission, the process may return to step 802 to await receipt of additional schedule information identifying the tone/modulation/time to be used for the next pilot, data, or ranging tone. In some systems, the previously-provided schedule may already provide this information, in which case step 802 may either be a check for an update/modification to that schedule, or be skipped altogether if no new schedule is needed.

In no acknowledgement was received in step 807, then in step 809, the device may register a failure. The failure may also result in the device choosing a different level of modulation for the next time a pilot, data, or ranging signal is sent on the same tone. This dynamic changing of modulation level may use an automatic repeat request (ARQ) approach, and may be automatically carried out according to a predetermined schedule (e.g., automatically drop one level when there is a failure; automatically drop one level when there are three failures in a row, etc.). The device may also use a higher amount of forward error correction (FEC) in the next transmission of the pilot signal. In some embodiments, the device may continue to re-transmit the pilot signal packet, at lower and lower levels of modulation and with greater and greater levels of FEC, until it is acknowledged. In some embodiments, a modulation rate may be chosen to accept a certain amount of error (e.g., a 10% error rate), so the schedule there may involve having the device retry a tone and modulation combination even after it is unsuccessful the first time.

The central controller may also note this failure, since it was expecting a pilot or ranging signal according to the schedule, but did not receive one. The process may then return to step 802 to await additional schedule information, as discussed above.

The discussion above has generally discussed each modem sending a single pilot or ranging signal on a given tone. However, multiple modems may transmit on a single tone, if desired, using any desired channel sharing technique. For example, a code division multiple access (CDMA) scheme may be used to allow multiple modems to transmit on a single tone. Such a CDMA scheme may, for example, allow multiple different cable modems to transmit signals on a particular tone. The schedule transmitted to the modems in step 704 may also identify how the modems are to share tones, such as by providing CDMA codes to the various modems. Frequency hopping, time-division multiple access (TDMA) and other techniques may also be used.

Figure 9:
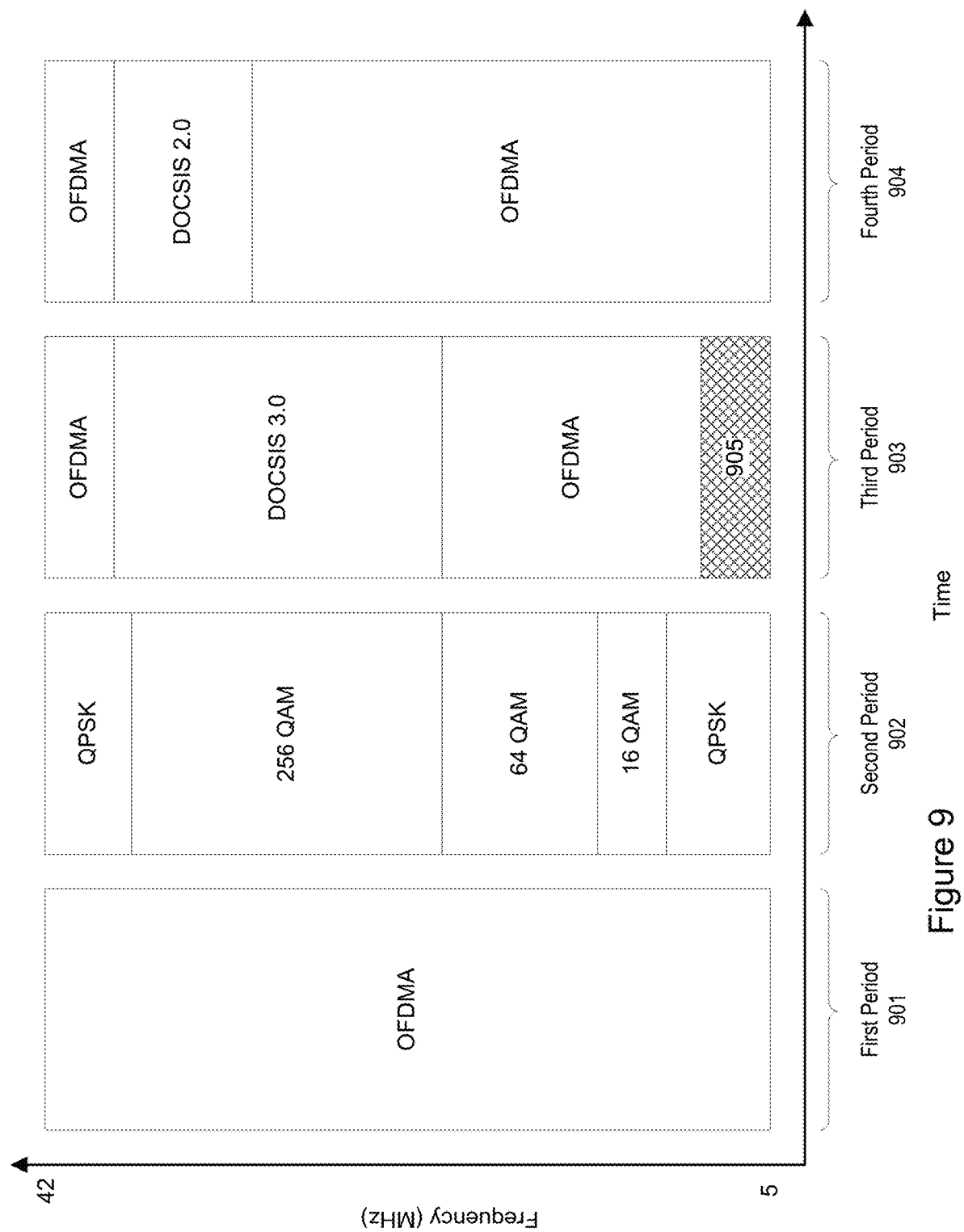
FIG. 9 illustrates an example frequency map that includes accommodations for backwards compatibility.

FIG. 9 illustrates another example frequency map, similar to that shown in FIG. 5, but illustrating how the different tone modulations may be adapted for different time periods (not necessarily sequential) in the various tones of the upstream portion of the spectrum (in this example, and for illustration only, the 5-42 MHz range of a coaxial cable or an HFC network). The first example time period 901 represents an ideal situation, in which minimal interference exists and the cable modem is able to use all tones at the maximum modulation. That maximum modulation may be, for example, an orthogonal frequency division multiple access (OFDMA) modulation scheme. The second example time period 902 may illustrate a time in which greater interference exists. A lower form of modulation (e.g., QPSK) may be used at the upper and lower ends of the spectrum, and tones in between may have variations in performance. In many cases, lower frequency signals are more susceptible to noise and interference, so the example time period 902 shows the modulation at the lower-frequency tones being lower than the modulation at higher-frequency tones.

As noted above, the time period used for the tones may be a value that corresponds with upstream burst periods used in DOCSIS, in one type of example network. For example, a 100-microsecond symbol period may be an ideal duration to allow for a DOCSIS upstream burst to occur. To avoid interference, the tones that are found in the DOCSIS upstream burst frequency range may be selectively deactivated for the duration of the DOCSIS upstream burst. As illustrated in FIG. 9, the third time period 903 shows a range of tones that corresponds with DOCSIS 3.0 upstream burst traffic, so the central controller may simply deactivate (or refuse to allocate) those tones for the duration of the DOCSIS burst. Tones lying in other frequency ranges, such as the tones in the two OFDMA regions of period 903, may still be allocated for use. Similarly, in the fourth time period 904, tones that lie in the upstream DOCSIS 2.0 burst, for example, may be deactivated as well, to allow those bursts to occur. Older versions of DOCSIS, such as 1.1, may be treated in the same manner. This coordination may be made easier by having the centralized controller act as the DOCSIS CMTS.

Deactivation of tones may be made for other reasons as well. For example, burst noise situations may result in the system deactivating ranges of tones. Range 905 in FIG. 9 is an example of such tones being deactivated for a time period due to burst noise.

Figure 10:
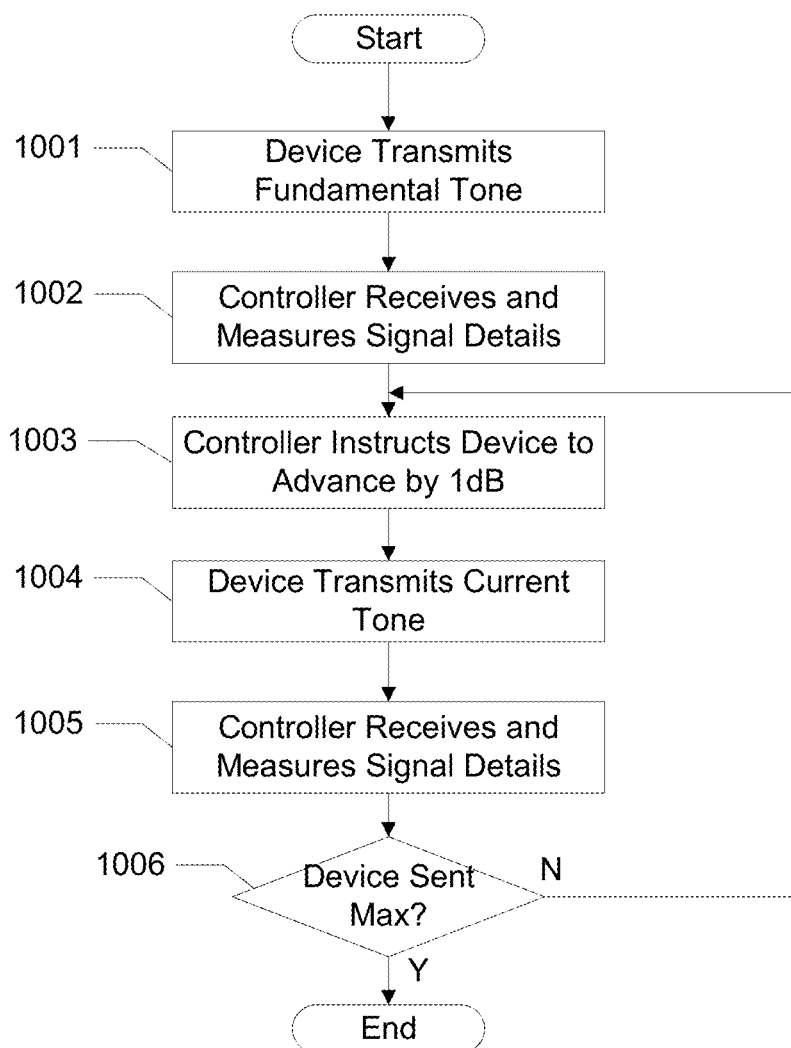
FIG. 10 illustrates an example process of handling distortions in the signal path between devices.

As noted above, ranging signals may be used to help offset distortions occurring in the signal path between the device and the central controller. Due to the individually-controllable multitude of tones, ranging and predistortion may be handled for both the fundamental tone and its harmonics. FIG. 10 illustrates an example process for this predistortion. In the FIG. 10 example, a ranging signal may be transmitted on a fundamental tone, at 0 dBmV, in step 1001 (transmitted as per step 806 above, for example).

The ranging signal may include a time value for the transmission, and a value identifying the transmitting device and/or the tone on which the ranging signal was initially transmitted. The central controller may receive the ranging signal in step 1002, and measure the amplitude and phase distortion of the fundamental tone and its received harmonics. The controller may then instruct the device in step 1003 to increase the ranging signal by 1 dB, for example, and send it again. The device can transmit it again at the new level in step 1004, and the controller can once again receive the signal and measure the amplitude and phase distortion of the tone and its harmonics in step 1005. The controller may check, in step 1006, whether the maximum strength (e.g., 60 dB) has been tested. If it has, the process can end, but if it hasn't, the process can return to step 1003 to advance by another dB, and repeat. The controller can then store information identifying, for each modem and for each of the amplitudes, amplitude and phase distortions experienced by a signal from the modem to the controller. This information, which can be stored in a database as a nonlinear distortion profile, may then be supplied to individual modems for use in predistorting their future transmissions.

The multitude of tones advantageously allows the device to range not only on the fundamental tone, but to also range on harmonics of the tone. Using a 5 MHz example, the steps may be repeated for the harmonics (e.g., tones on the 10 MHz, 15 MHz and 20 MHz harmonics of the fundamental 5 MHz tone). As a result, the device will have received delay and amplitude/phase distortion information for the fundamental tone and its harmonics.

When the device knows of the delay and amplitude/phase offsets (or distortions) created by transmitting on a given fundamental tone, the device can use that information the next time it transmits data on that tone. When it does so, it can adjust the signal, or predistort it, to offset (e.g., by adding a 180-degree opposite signal to the amplitude/phase distortion) the distortions introduced along the signal path to the central controller. This predistortion may be added to the fundamental tone being transmitted, and other predistortions may also be added to the harmonics of that tone, based on the distortions measured on the harmonics. Predistorting the fundamental tone signal and the harmonics can help minimize overall distortions and allow for higher modulation and channel capacity. For example, if a different device were to use a harmonic tone for transmitting data, the interference caused by the first device's fundamental tone may be offset, allowing for a cleaner signal on the harmonic for the different device.

Figure 11:
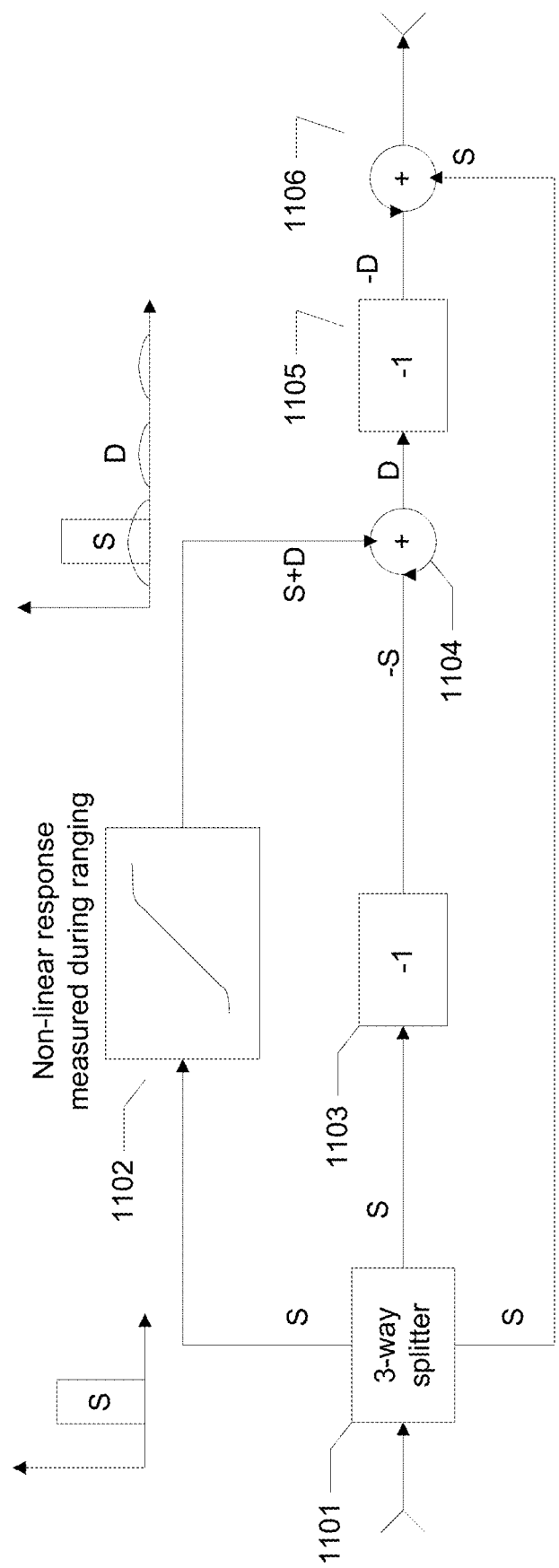
FIG. 11 illustrates an example nonlinear ranging process to measure distortion.

FIG. 11 illustrates an example diagram of a modem having a pre-distortion circuit, which can be used with embodiments described herein. The components can be implemented using any desired RF or digital components (which may involve use of an analog-to-digital converter if signals are processed in the digital domain). On the left side, a signal (S) that the modem is preparing to transmit may be split with a three-way splitter 1101. One of the signals (the top one in FIG. 11) may be supplied to a circuit 1102 that subjects the signal to the same non-linear characteristics measured by the modem termination server for this modem during non-linear harmonic ranging. The output of this distortion circuit 1102 may be the original signal plus predistortion (S+D).

A second one of the signals (the middle one in FIG. 11) may be supplied to a phase shifter, which can shift the signal (S) by 180° phase (illustrated as a negative one (−1)), resulting in an inverse of the signal (−S).

The third one of the signals (the bottom one in FIG. 11) may be just a copy of the original signal (S).

The top two signals may be summed at a summing circuit 1104, resulting in a signal containing just the distortion (D) measured by the modem termination server. This distortion (D) may be supplied to another 180° phase shifter 1105, resulting in an inverse of the distortion (−D). This negative distortion (−D) can be combined with the original signal (S) at a summing circuit 1106, to result in an output signal containing the original signal (S) and an inverse of the distortion (−D) that the signal is expected to encounter on its way to the modem termination server.

When this signal hits the return path laser on its way to the modem termination server, distortion components will be produced that are 180 degrees out of phase with the distortion components artificially produced in the cable modem, S−D+D=S. The distortion components cancel and only the signal is present at the output of the optical receiver.

This can be adjusted in an adaptive closed loop system so that the modem termination server measures errors and adjusts pre-distortion parameters to minimize the mean squared error. By doing this the carriers at 10, 20, 30, and 40 MHz are all usable. Since a carrier can have as much as 25 Mbps data throughput, this method could potentially add as much as 25 Mbps of upstream capacity.

Simpler predistortion methods could also be used that have less benefit, but still provide substantial capacity increase. For example, by varying the modem transmit power and monitoring the harmonic distortion during a ranging process, the optimum signal-to-noise ratio (SNR) input level to the return path amplifiers and fiber node can been measured. Thus the modem termination server could always direct the modem to transmit at the highest possible SNR. Since the return path characteristics change over time and temperature and there is measurement uncertainty in the manual set up of the return path input levels, the automatic optimization of the return path SNR can provide a significant improvement in SNR and thus upstream capacity.

These are just two examples of how non-linear harmonic ranging and pre-distortion can be implemented. The nonlinear response of the return path can be determined by the composite signal of the superposition of all carrier waveforms from all modems. The non-linear pre-distortion could account for the composite waveform which would require precision control and timing from multiple modems and upstream carriers. The pre-distortion circuit could account for just one dominant carrier while restricting other carriers to low levels that do not impact the non-linear characteristics. The pre-distortion circuit could also require that only one modem transmit at high power for specified time slots, so that only the non-linear response from a single modem need be accounted for in the pre-distortion circuit. The simplest method is to just sum the average powers of all the modems and set the amplitude of the modems so that the average power into the return path laser is at the highest level and yet still in the linear operating range.

The descriptions above are all illustrative examples. These features may be combined, divided, rearranged, removed, augmented, and otherwise altered as desired for any given implementation, and this patent should not be limited to the specific examples described. To the contrary, this patent should only be limited by the claims that follow.

We claim:

1. An apparatus comprising:
   one or more processors; and
   memory storing instructions that, when executed by the one or more processors, cause the apparatus to:
      receive a schedule indicating a plurality of pilot signals to be sent via a plurality of tones during a plurality of time periods;
      send, based on the schedule and via the plurality of tones, the plurality of pilot signals;
      adjust, based on data associated with sending of the plurality of pilot signals, a modulation scheme for subsequent sending of upstream signals via one or more of the plurality of tones; and
      send, based on the adjusted modulation scheme and via the one or more of the plurality of tones, an upstream signal.

2. The apparatus of claim 1, wherein each tone, of the plurality of tones, comprises a representative tone, of a range of tones, that represents neighboring tones, of the representative tone, in the range of tones.

3. The apparatus of claim 1, wherein the schedule further indicates a second modulation scheme different from the adjusted modulation scheme, and
   wherein the instructions, when executed by the one or more processors, further cause the apparatus to send the plurality of pilot signals by sending, based on the second modulation scheme, the plurality of pilot signals.

4. The apparatus of claim 1, wherein the instructions, when executed by the one or more processors, further cause the apparatus to send the plurality of tones by sending a request for allocating at least one tone of the plurality of tones to the apparatus for the subsequent sending of upstream signals.

5. The apparatus of claim 1, wherein the instructions, when executed by the one or more processors, further cause the apparatus to send the upstream signal by adjusting, based on the adjusted modulation scheme, different amplitudes or phases of the upstream signal.

6. The apparatus of claim 1, wherein the one or more of the plurality of tones comprise a fundamental tone and one or more harmonics of the fundamental tone.

7. The apparatus of claim 1, wherein the data associated with the sending of the plurality of pilot signals is based on effective modulation rates of the plurality of pilot signals during the sending of the plurality of pilot signals.

8. The apparatus of claim 1, wherein the instructions, when executed by the one or more processors, further cause the apparatus to:
   receive a message of a failed attempt of sending a pilot signal of the plurality of pilot signals; and
   send a retransmission of the pilot signal, wherein the retransmission is based on:
      a lower rate of modulation than the failed attempt, or
      a greater level of forward error correction than the failed attempt.

9. The apparatus of claim 1, wherein the data associated with the sending of the plurality of pilot signals comprises one or more indications of allocations of the one or more of the plurality of tones to the apparatus.

10. A system comprising:
    a first device and a second device,
    wherein the first device comprises:
       one or more processors; and
       memory storing instructions that, when executed by the one or more processors, cause the first device to:
          receive a schedule indicating a plurality of pilot signals to be sent via a plurality of tones during a plurality of time periods;
          send, to the second device, based on the schedule, and via the plurality of tones, the plurality of pilot signals;
          adjust, based on data associated with sending of the plurality of pilot signals, a modulation scheme for subsequent sending of upstream signals via one or more of the plurality of tones; and
          send, based on the adjusted modulation scheme and via the one or more of the plurality of tones, an upstream signal, and
    wherein the second device is configured to receive the plurality of pilot signals.

11. The system of claim 10, wherein each tone, of the plurality of tones, comprises a representative tone, of a range of tones, that represents neighboring tones, of the representative tone, in the range of tones.

12. The system of claim 10, wherein the schedule further indicates a second modulation scheme different from the adjusted modulation scheme, and
    wherein the instructions, when executed by the one or more processors, further cause the first device to send the plurality of pilot signals by sending, based on the second modulation scheme, the plurality of pilot signals.

13. The system of claim 10, wherein the instructions, when executed by the one or more processors, further cause the first device to send the plurality of tones by sending a request for allocating at least one tone of the plurality of tones to the first device for the subsequent sending of upstream signals.

14. The system of claim 10, wherein the instructions, when executed by the one or more processors, further cause the first device to send the upstream signal by adjusting, based on the adjusted modulation scheme, different amplitudes or phases of the upstream signal.

15. The system of claim 10, wherein the one or more of the plurality of tones comprise a fundamental tone and one or more harmonics of the fundamental tone.

16. The system of claim 10, wherein the data associated with the sending of the plurality of pilot signals is based on effective modulation rates of the plurality of pilot signals during the sending of the plurality of pilot signals.

17. The system of claim 10, wherein the instructions, when executed by the one or more processors, further cause the first device to:
    receive a message of a failed attempt of sending a pilot signal of the plurality of pilot signals; and
    send a retransmission of the pilot signal, wherein the retransmission is based on:
       a lower rate of modulation than the failed attempt, or
       a greater level of forward error correction than the failed attempt.

18. The system of claim 10, wherein the data associated with the sending of the plurality of pilot signals comprises one or more indications of allocations of the one or more of the plurality of tones to the first device.

19. A non-transitory computer readable medium storing instructions that, when executed, cause:
   receiving a schedule indicating a plurality of pilot signals to be sent via a plurality of tones during a plurality of time periods;
   sending, based on the schedule and via the plurality of tones, the plurality of pilot signals;
   adjusting, based on data associated with the sending of the plurality of pilot signals, a modulation scheme for subsequent sending of upstream signals via one or more of the plurality of tones; and
   sending, based on the adjusted modulation scheme and via the one or more of the plurality of tones, an upstream signal.

20. The non-transitory computer readable medium of claim 19, wherein each tone, of the plurality of tones, comprises a representative tone, of a range of tones, that represents neighboring tones, of the representative tone, in the range of tones.

21. The non-transitory computer readable medium of claim 19, wherein the schedule further indicates a second modulation scheme different from the adjusted modulation scheme, and
   wherein the instructions, when executed, further cause the sending the plurality of pilot signals by sending, based on the second modulation scheme, the plurality of pilot signals.

22. The non-transitory computer readable medium of claim 19, wherein the instructions, when executed, further cause the sending the plurality of tones further by sending a request for allocating at least one tone of the plurality of tones to a computing device for the subsequent sending of upstream signals.

23. The non-transitory computer readable medium of claim 19, wherein the instructions, when executed, further cause the sending the upstream signal by adjusting, based on the adjusted modulation scheme, different amplitudes or phases of the upstream signal.

24. The non-transitory computer readable medium of claim 19, wherein the one or more of the plurality of tones comprise a fundamental tone and one or more harmonics of the fundamental tone.

25. The non-transitory computer readable medium of claim 19, wherein the data associated with the sending of the plurality of pilot signals is based on effective modulation rates of the plurality of pilot signals during the sending of the plurality of pilot signals.

26. The non-transitory computer readable medium of claim 19, wherein the instructions, when executed, further cause:
   receiving a message of a failed attempt of sending a pilot signal of the plurality of pilot signals; and
   sending a retransmission of the pilot signal, wherein the retransmission is based on:
      a lower rate of modulation than the failed attempt, or
      a greater level of forward error correction than the failed attempt.

27. The non-transitory computer readable medium of claim 19, wherein the data associated with the sending of the plurality of pilot signals comprises one or more indications of allocations of the one or more of the plurality of tones to a computing device.

28. An apparatus comprising:
   one or more processors; and
   memory storing instructions that, when executed by the one or more processors, cause the apparatus to:
      receive a schedule indicating a plurality of pilot signals to be sent via a plurality of tones during a plurality of time periods;
      send, based on the schedule and via the plurality of tones, the plurality of pilot signals;
      receive, after sending of the plurality of pilot signals, data indicating an allocation of one or more selected tones, of the plurality of tones, to the apparatus for sending of subsequent upstream signals at a particular modulation rate; and
      send, based on the particular modulation rate and via the one or more selected tones, an upstream signal.

29. The apparatus of claim 28, wherein the instructions, when executed by the one or more processors, cause the apparatus to send the plurality of pilot signals further based on determining whether the particular modulation rate satisfies requirements of the apparatus.

30. The apparatus of claim 28, wherein the instructions, when executed by the one or more processors, further cause the apparatus to:
   receive data indicating a modulation scheme for the subsequent upstream signals, wherein the modulation scheme comprises instructions for adding, prior to sending of the subsequent upstream signals, predistortion characteristics to the subsequent upstream signals by adjusting amplitudes or phases of the subsequent upstream signals.

31. The apparatus of claim 28, wherein the one or more selected tones comprise a fundamental tone and one or more harmonics of the fundamental tone.

32. The apparatus of claim 28, wherein the one or more selected tones are selected based on effective modulation rates of the one or more selected tones during the sending of the plurality of pilot signals via the one or more selected tones.

33. The apparatus of claim 28, wherein the instructions, when executed by the one or more processors, further cause the apparatus to:
   receive a message of a failed attempt of sending a pilot signal of the plurality of pilot signals; and
   send a retransmission of the pilot signal, wherein the retransmission is based on:
      a lower rate of modulation than the failed attempt, or
      a greater level of forward error correction than the failed attempt.

34. A system comprising:
   a first device and a second device,
   wherein the first device comprises:
      one or more processors; and
      memory storing instructions that, when executed by the one or more processors, cause the first device to:
         receive a schedule indicating a plurality of pilot signals to be sent via a plurality of tones during a plurality of time periods;
         send, based on the schedule and via the plurality of tones, the plurality of pilot signals;
         receive, after sending of the plurality of pilot signals, data indicating an allocation of one or more selected tones, of the plurality of tones, to the first device for sending of subsequent upstream signals at a particular modulation rate; and
         send, based on the particular modulation rate and via the one or more selected tones, an upstream signal, and
   wherein the second device is configured to send the schedule to the first device.

35. The system of claim 34, wherein the instructions, when executed by the one or more processors, cause the first device to send the plurality of pilot signals further based on determining whether the particular modulation rate satisfies requirements of the first device.

36. The system of claim 34, wherein the instructions, when executed by the one or more processors, cause the first device to:
receive data indicating a modulation scheme for the subsequent upstream signals, wherein the modulation scheme comprises instructions for adding, prior to sending of the subsequent upstream signals, predistortion characteristics to the subsequent upstream signals by adjusting amplitudes or phases of the subsequent upstream signals.

37. The system of claim 34, wherein the one or more selected tones comprise a fundamental tone and one or more harmonics of the fundamental tone.

38. The system of claim 34, wherein the one or more selected tones are selected based on effective modulation rates of the one or more selected tones during the sending of the plurality of pilot signals via the one or more selected tones.

39. The system of claim 34, wherein the instructions, when executed by the one or more processors, cause the first device to:
receive a message of a failed attempt of sending a pilot signal of the plurality of pilot signals; and
send a retransmission of the pilot signal, wherein the retransmission is based on:
a lower rate of modulation than the failed attempt, or
a greater level of forward error correction than the failed attempt.

40. A non-transitory computer readable medium storing instructions that, when executed, cause:
receiving a schedule indicating a plurality of pilot signals to be sent via a plurality of tones during a plurality of time periods;
sending, based on the schedule and via the plurality of tones, the plurality of pilot signals;
receiving, after sending of the plurality of pilot signals, data indicating an allocation of one or more selected tones, of the plurality of tones, to a computing device for sending of subsequent upstream signals at a particular modulation rate; and
sending, based on the particular modulation rate and via the one or more selected tones, an upstream signal.

41. The non-transitory computer readable medium of claim 40, wherein the instructions, when executed, further cause the sending the plurality of pilot signals further based on determining whether the particular modulation rate satisfies requirements of the computing device.

42. The non-transitory computer readable medium of claim 40, wherein the instructions, when executed, further cause:
receiving data indicating a modulation scheme for the subsequent upstream signals, wherein the modulation scheme comprises second instructions for adding, prior to sending of the subsequent upstream signals, predistortion characteristics to the subsequent upstream signals by adjusting amplitudes or phases of the subsequent upstream signals.

43. The non-transitory computer readable medium of claim 40, wherein the one or more selected tones comprise a fundamental tone and one or more harmonics of the fundamental tone.

44. The non-transitory computer readable medium of claim 40, wherein the one or more selected tones are selected based on effective modulation rates of the one or more selected tones during the sending of the plurality of pilot signals via the one or more selected tones.

45. The non-transitory computer readable medium of claim 40, wherein the instructions, when executed, further cause:
receiving a message of a failed attempt of sending a pilot signal of the plurality of pilot signals; and
sending a retransmission of the pilot signal, wherein the retransmission is based on:
a lower rate of modulation than the failed attempt, or
a greater level of forward error correction than the failed attempt.

46. An apparatus comprising:
one or more processors; and
memory storing instructions that, when executed by the one or more processors, cause the apparatus to:
send, based on a schedule indicating a plurality of pilot signals to be sent via a plurality of tones during a plurality of time periods, the plurality of pilot signals via the plurality of tones;
receive, after sending the plurality of pilot signals, data indicating:
a fundamental tone, of the plurality of tones, that is allocated to the apparatus;
one or more harmonic tones corresponding to the fundamental tone; and
adjustments of one or more modulation schemes for sending of subsequent upstream signals via the fundamental tone and the one or more harmonic tones; and
send, based on the adjusted one or more modulation schemes and via the fundamental tone or the one or more harmonic tones, an upstream signal.

47. The apparatus of claim 46, wherein each tone, of the plurality of tones, comprises a representative tone, of a range of tones, that represents neighboring tones, of the representative tone, in the range of tones.

48. The apparatus of claim 46, wherein the instructions, when executed by the one or more processors, further cause the apparatus to send the upstream signal by adding, based on the adjusted one or more modulation schemes, predistortion characteristics to the upstream signal by adjusting amplitudes or phases of the upstream signal.

49. The apparatus of claim 46, wherein the fundamental tone is allocated based on an effective modulation rate of the fundamental tone during the sending of the plurality of pilot signals via the fundamental tone.

50. The apparatus of claim 46, wherein the instructions, when executed by the one or more processors, further cause the apparatus to:
receive a message of a failed attempt of sending a pilot signal of the plurality of pilot signals; and
send a retransmission of the pilot signal, wherein the retransmission is based on:
a lower rate of modulation than the failed attempt, or
a greater level of forward error correction than the failed attempt.

51. A system comprising:
a first device and a second device,
wherein the first device comprises:
one or more processors; and
memory storing instructions that, when executed by the one or more processors, cause the first device to:

send, based on a schedule indicating a plurality of pilot signals to be sent via a plurality of tones during a plurality of time periods, the plurality of pilot signals via the plurality of tones;

receive, after sending the plurality of pilot signals, data indicating:
 a fundamental tone, of the plurality of tones, that is allocated to the first device;
 one or more harmonic tones corresponding to the fundamental tone; and
 adjustments of one or more modulation schemes for sending of subsequent upstream signals via the fundamental tone and the one or more harmonic tones; and send, based on the adjusted one or more modulation schemes and via the fundamental tone or the one or more harmonic tones, an upstream signal, and wherein the second device is configured to send the schedule to the first device.

52. The system of claim 51, wherein each tone, of the plurality of tones, comprises a representative tone, of a range of tones, that represents neighboring tones, of the representative tone, in the range of tones.

53. The system of claim 51, wherein the instructions, when executed by the one or more processors, further cause the first device to send the upstream signal by adding, based on the adjusted one or more modulation schemes, predistortion characteristics to the upstream signal by adjusting amplitudes or phases of the upstream signal.

54. The system of claim 51, wherein the fundamental tone is allocated based on an effective modulation rate of the fundamental tone during the sending of the plurality of pilot signals via the fundamental tone.

55. The system of claim 51, wherein the instructions, when executed by the one or more processors, further cause the first device to:
 receive a message of a failed attempt of sending a pilot signal of the plurality of pilot signals; and
 send a retransmission of the pilot signal, wherein the retransmission is based on:
  a lower rate of modulation than the failed attempt, or
  a greater level of forward error correction than the failed attempt.

56. A non-transitory computer readable medium storing instructions that, when executed, cause:

sending, based on a schedule indicating a plurality of pilot signals to be sent via a plurality of tones during a plurality of time periods, the plurality of pilot signals via the plurality of tones;

receiving, after sending the plurality of pilot signals, data indicating:
 a fundamental tone, of the plurality of tones, that is allocated to a computing device;
 one or more harmonic tones corresponding to the fundamental tone; and
 adjustments of one or more modulation schemes for sending of subsequent upstream signals via the fundamental tone and the one or more harmonic tones; and sending, based on the adjusted one or more modulation schemes and via the fundamental tone or the one or more harmonic tones, an upstream signal.

57. The non-transitory computer readable medium of claim 56, wherein each tone, of the plurality of tones, comprises a representative tone, of a range of tones, that represents neighboring tones, of the representative tone, in the range of tones.

58. The non-transitory computer readable medium of claim 56, wherein the instructions, when executed, further cause the sending the upstream signal by adding, based on the adjusted one or more modulation schemes, predistortion characteristics to the upstream signal by adjusting amplitudes or phases of the upstream signal.

59. The non-transitory computer readable medium of claim 56, wherein the fundamental tone is allocated based on an effective modulation rate of the fundamental tone during the sending of the plurality of pilot signals via the fundamental tone.

60. The non-transitory computer readable medium of claim 56, f wherein the instructions, when executed, further cause:
 receiving a message of a failed attempt of sending a pilot signal of the plurality of pilot signals; and
 send a retransmission of the pilot signal, wherein the retransmission is based on:
  a lower rate of modulation than the failed attempt, or
  a greater level of forward error correction than the failed attempt.

* * * * *